United States Patent [19]
Tran

[11] Patent Number: 5,991,742
[45] Date of Patent: Nov. 23, 1999

[54] TIME AND EXPENSE LOGGING SYSTEM

[76] Inventor: Bao Q. Tran, 10206 Grove Glen, Houston, Tex. 77099

[21] Appl. No.: 08/650,293

[22] Filed: May 20, 1996

[51] Int. Cl.⁶ .................................................... G06F 13/00
[52] U.S. Cl. ............................... 705/32; 705/11; 702/176; 702/178; 702/187; 364/143
[58] Field of Search .................................. 705/41, 11, 28, 705/30, 32, 34, 40, 404, 418; 704/875, 251; 382/187, 186; 702/176, 178, 187

[56] References Cited

U.S. PATENT DOCUMENTS

| | | | |
|---|---|---|---|
| 4,604,699 | 8/1986 | Borcherdt | 364/420 |
| 5,123,064 | 6/1992 | Hacker | 382/59 |
| 5,235,565 | 8/1993 | Aschenbrouich | 364/464.01 |

(List continued on next page.)

OTHER PUBLICATIONS

Author Unknown, Portions of Manual for Expense It!.
Jerry Harris, Portions of Manual for Quickxpense (1994).
Author Unknown, Chapters 3–6 of "Getting a Grip on Time".
Darryl Jenkins, Chapter 16 of "Savvy Business Travel" (1993).
Arnold Van Beverhoudt Jr., "Time Keeper", 80 Micro, pp. 85, 86, 88, 92, 94, 95, 97–99 (Oct. 1984).
David Goldstein, "Automated Time Tracking", J. of Law Office Productivity (Oct. 1992).
Software Review, "Carpe Diem: Time Entry Made Easy for Lawyers", J. of Law Office Productivity (May 1993).
Author Unknown, Brochure for the Associate Counsel, Morning Star Tech. Corp (1992).
Gavel & Gown Software, Brochure for Amicus™ Attorney.
Rebecca Nagel, "Amicus Attorney. APIM for Attorneys", Law Office Computing (Apr./May 1996).
Brent Roper, "Amicus Attorney for Windows and Macintosh," Legal Assistant Today (May 1995).
Dave Robertson, "The Joys of Legal Software", The Writ (Feb. 1996, vol. 18, No. 2).
Paul Bernstein, "Amicus Attorney Software: A Lawyer's Friend Indeed", Illinois Legal Times (Feb. 1995) vol. 9, No. 94.
Lewis Eisen, "Amicus Attorney", Csalt Review, Spring 1995.
Gerry Blackwell, "Letting Computers Sweat the Details," Canaduan Lawyer (Nov. Dec. 1995).
In Re Nation/Ruskin, Inc., Debtor, Bankruptcy No. 80–02621k, U.S. Bankruptcy Court, E. D. Pennsylvania, p. 211.
U.S. Robotics, Inc.—Palm Computing Division, Pilot™ Handbook (1996).
J. Svenson, Filling Expenses Via American Express, Information Week Jul. 1, 1996 p. 103.
E.Boug, TLC for T & E Headaches, Business Week, Jun. 10, 1996 p. 200.
J. Schwartz, Electronic Expense Management, Comm. Week, Jul. 8, 1996 p. 16.
D. MacNeil, Expense Plus 2.0–Newton Software Review— Pen Comp. Mag. Feb. 1996, p. 45.
Franklin Quest, Brochure for Pilot Organizer with Ascend 97 Software (1996).
Orcale Inc., Orcale Mobile Agents White Paper (Mar. 1995).
Fuller, Scott M., and Pagan, Kevin, Learn Timeslips for Windows in a Day, 1994.
Newton Apple Message Pad Solutions for Sales Professionals, Sales Literature, May 1995.

*Primary Examiner*—Allen R. MacDonald
*Assistant Examiner*—Jagdish Patel
*Attorney, Agent, or Firm*—Kurt J. Brown

[57] ABSTRACT

A portable computer system manages data conveniently for a user. The system has a processor, a program storage device coupled to the processor, an input recognizer adapted to receive data from the user, and a computer readable code embodied in the program storage device for storing and processing the data.

21 Claims, 10 Drawing Sheets

U.S. PATENT DOCUMENTS

| | | | |
|---|---|---|---|
| 5,365,050 | 11/1994 | Worthington | 235/472 |
| 5,463,696 | 10/1995 | Beernink et al. | 382/186 |
| 5,477,511 | 12/1995 | Englehardt | 369/25 |
| 5,493,492 | 2/1996 | Cramer et al. | 364/406 |
| 5,502,805 | 3/1996 | Anderson | 395/148 |
| 5,506,902 | 4/1996 | Kubota | 380/9 |
| 5,510,606 | 4/1996 | Worthington et al. | 235/472 |
| 5,514,861 | 5/1996 | Swartz et al. | 235/472 |
| 5,515,455 | 5/1996 | Govindaraju | 382/186 |
| 5,526,407 | 6/1996 | Russel | 379/89 |
| 5,546,538 | 8/1996 | Cobbley | 395/200.01 |
| 5,559,897 | 9/1996 | Brown et al. | 382/186 |
| 5,602,963 | 2/1997 | Bissonnette | 395/2.84 |
| 5,606,497 | 2/1997 | Carmer | 395/232 |
| 5,745,268 | 4/1998 | Eastvold | 359/110 |

TIME AND EXPENSE LOGGING SYSTEM

FIELD OF THE INVENTION

This invention relates to a computer system, and more specifically, to a computer system for recording time and expense associated with activities performed on behalf of a client by a service provider.

BACKGROUND OF THE INVENTION

As industrialized nations transition from manufacturing-oriented economies to service-oriented economies, new accounting systems need to be developed to better account for the services being performed by service providers. Conventionally, the service provider keeps a time log which accounts for the time that he or she works on a particular project. Periodically, the time log is provided to the service provider's accounting department which sums the total hours worked on each project by all service providers. At the end of each reporting period, the accounting department invoices the client for the value of the services performed. The preparation of periodic billing statements is accomplished by calculating charges associated with the time spent on the client's matters, as reported in the daily logs, and further by adding any out-of-pocket expenses chargeable to the client for that period. The completed bills are typically reviewed by a supervisor or a responsible individual before they are sent to clients.

Traditionally, the time log is manually recorded on blank sheets of paper or on pre-formatted paper forms. For a number of reasons, the conventional pen and paper time logging approach can be inefficient and inaccurate. For instance, when the service provider is too absorbed in rendering his or her services, he or she may neglect to record his or her activities on the log. Further, papers used to log time is subject to being misplaced. When the activity is not logged, the service provider and his or her employer do not get credit for services rendered.

The pen and paper logging approach also potentially doubles the amount of work necessary to generate bills from the computer, as the information from the paper log needs to be converted into an electronic form suitable for further processing. Such conversion typically requires data entry services performed by one or more computer operators. Additionally, as these operators may make mistakes and errors which include, among others, inaccuracies associated with the misreading of the manual entries as well as the mistyping of the entries, the manual time log approach further requires a proof-reader to ensure correct data entries. As such, the paper and pen approach is inefficient and potentially inaccurate. The resulting uncaptured time represents lost opportunities to the service provider and his or her employer.

As discussed in U.S. Pat. No. 5,493,492, a number of automated data entry systems are available which simplify the process of collecting time and expense information associated with work activities. For example, systems employing identification cards and card readers have been deployed in various manufacturing environments to track employees' time in handling work-related tasks. Other systems have been designed to provide time and billing information for doctors, lawyers and other professional service providers. However, these systems typically operate on desktop computers or portable and notebook computers. As such, these systems require some typing skills as well as familiarity with the operation of the computers. Further, time and billing systems require the users to have constant access to the computers. For busy executives, attorneys, doctors and other professionals who are constantly on their feet and who do not have ready access to desktop or notebook computers, such restrictions are overly burdensome. Thus, the time and billing system needs to be portable, cost effective, and easy to use in comparison with the pen and paper approach before such computerized solution can replace the conventional method of tracking time and expenses. In addition to being as easy to use as the pen and paper approach, the time and billing system needs to provide information integration advantages over the cheaper pen and paper approach to further justify the expense associated with such electronic time logging systems.

SUMMARY OF THE INVENTION

The present invention provides a computer system which accepts data from the user using an input recognizer such as a handwriting recognizer or a speech recognizer. The data from the recognizer is processed by a microprocessor and stored in a memory such as a battery backed random-access-memory or a non-volatile memory such as a flash read-only-memory or a disk. The recorded data include a client identification, a matter identification, a billing rate, and a description for the activity being performed by the service provider.

A timer is connected to the microprocessor to identify and store the start and the stop times for each activity or task being performed. Further, the timer can be suspended for each project as necessary to temporally suspend the billing clock for non-billable interruptions to prevent overbilling and, after the interruption, to continue the billing clock. The interruptions can be captured and categorized for subsequent analysis. When a particular activity or task is completed, the total time interval spent on the project is recorded. The time recorded may be the actual time spent, or some multiple of time thereof in accordance with a predetermined minimum time segment policy. Additionally, the present invention also tracks non-time related expenses and costs such as telephone calls made on the clients behalf, or travel related expenses or goods necessary to carry out the task or activity, among others.

A number of reports can be generated to allow the user to keep track of billing time related bills and non-time related costs for multiple clients, each of whom may have different matters with different billing rates. The billing rate may be a standard rate, or may be a user definable billing rate that varies according to the matter classification.

The computer system also integrates the time and billing system with an address book, an appointment book, a to-do list, and a memo-writing program such that the client and matter information are conveniently shared among applications to prevent duplicate data entry. The data stored in this database are integrated so that entries in the appointment book and the to-do list are also reflected in the time and billing system. For instance, as an appointment or a to-do item is made, the user is prompted to enter the client information, and the matter information, and the description. When the computer system generates a reminder to the user, the data logging system also asks the user if the event will occur as originally planned. If the user accepts, the information from the appointment book is copied into the time and billing system to minimize the need for duplicate entries. Thus, when the user places a call or conducts a meeting on behalf of the client pursuant to a previously scheduled appointment, the event is automatically logged under the appropriate client and matter while the timer is started to capture billing time.

When the data logger is docked with the computer running the accounting system, the data stored in the nonvolatile memory is retrieved and uploaded to an accounting system for billing purposes. As work related charges are recorded on the spot, the user captures more of his or her billable times. Further, the captured data is already in a format that can be transparently imported into the accounting and billing system. Thus, errors related to incorrect data entries or misreading of the user's handwritings are avoided. Additionally, as the present invention links information stored in other systems, such as the calendar appointment, address book, and to-do list, to the time and billing system, information stored in the appointment or the to-do list can be linked to entries in the time and expense system as appropriate.

As the present invention records the time spent by the user in performing the task with fidelity, the computerized bills show more details which can be used as a tool to more effectively communicate and justify the charges to the client. In addition, since the bills have an extremely accurate appearance, similar to a credit card or utility bill, clients are more likely to pay them. The time and billing system of the present invention also helps the employer to capture more fully the time spent on a particular task and thus recovering lost fee and cost transactions. Further, the present invention frees up personnel in the back-office from the mundane task of entering and proofing data from handwritten logs. Additionally, by analyzing time spent in different cases in a detailed manner, the employer may discover emerging lucrative practice alternatives, or the employer may decide to avoid handling certain matter types. Thus, the time and billing system of the present invention is easy to use such that services performed can be captured more accurately and be annotated with more details to justify the charges. Further, the time and billing system decreases the time spent in preparing quality bills and increases the employer's cash flow.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 11 is a diagram illustrating the time-slip user interface; and

FIG. 12 is a diagram illustrating the expense-slip user interface.

DESCRIPTION OF THE INVENTION

Figure 1:
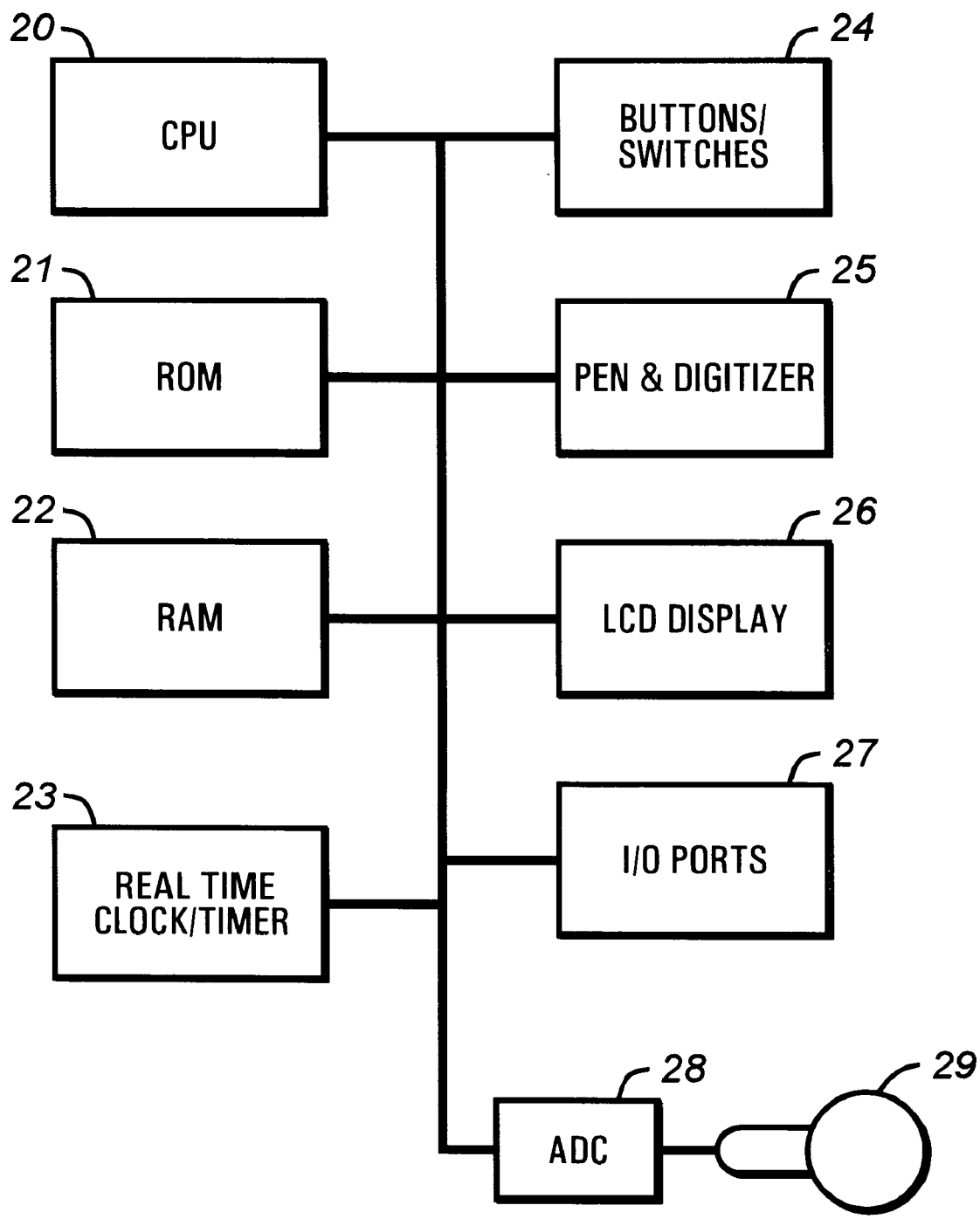
FIG. 1 is a block diagram of a computer system for logging data in accordance with the present invention.

FIG. 1 illustrates the computer system of the present invention for recording time and expense associated with activities performed on behalf of the client by the service provider. The data logger computer system is preferably housed in a small, rectangular enclosure. Referring now to FIG. 1, a general purpose architecture for logging data by writing or speaking to the data logger is illustrated. In FIG. 1, a processor 20 or central processing unit (CPU) provides the processing capability for the time and expense data logging system of the present invention. The processor 20 can be a reduced instruction set computer (RISC) processor or a complex instruction set computer (CISC) processor. Preferably, the processor 20 is a low power CPU.

The processor 20 is connected to a read-only-memory (ROM) 21 for receiving executable instructions as well as certain predefined data and variables. The processor 20 is also connected to a random access memory (RAM) 22 for storing various run-time variables and data arrays, among others. The RAM 22 is sufficient to store user application programs and data. In this instance, the RAM 22 can be provided with a back-up battery to prevent the loss of data even when the computer system is turned off. However, it is generally desirable to have some type of long term storage such as a commercially available miniature hard disk drive, or non-volatile memory such as a programmable ROM such as an electrically erasable programmable ROM, a flash ROM memory in addition to the ROM 21 for data back-up purposes. The RAM 22 stores the database of the present invention. The database is preferably a relational database. As is known in the art, the database has a number of files, including client files, matter files, activity files, short-hand code files, and others. Further, each file has one or more records. Additionally, each record has one or more fields for storing data. The individual fields and the type of information stored therein is discussed in subsequent illustrations.

The processor 20 is also connected to a real-time clock/ timer 23 which tracks time. The clock/timer 23 can be a dedicated integrated circuit for tracking the real-time clock data, or alternatively, the clock/timer 23 can be a software clock where time is tracked based on the clock signal clocking the processor 20. In the event that the clock/timer 23 is software-based, it is preferred that the software clock/ timer be interrupt driven to minimize the CPU loading. However, even an interrupt-driven software clock/timer 23 requires certain CPU overhead in tracking time. Thus, the real-time clock/timer integrated circuit 23 is preferable where high processing performance is needed.

Further, the timer portion of the clock/timer 23 can measure a duration count spanning one or more start times and completion times, as activated by the user. The timer portion has a duration count register which is cleared upon the start of each task. Further, the timer portion of the clock/timer 23 has an active state and a passive state. During operation, when the user toggles the timer portion into the active state, the duration count register is incremented. When the user toggles the timer portion into the suspended state, the duration count is preserved but not incremented. Finally, when the user completes a particular task, the value of the duration count register is stored into a duration field in the database to preserve the time spent on the particular task.

The computer system of the present invention receives instructions from the user via one or more switches such as push-button switches 24. Further, in one embodiment where the computer accepts handwritings as an input medium from the user, a digitizer 25, which is adapted to receive a pen (not shown), and a display LCD panel 26 having a viewing screen exposed along one of the planar sides of the enclosure are provided. The assembly combination of the digitizer 25 and the LCD panel 26 serves as an input/output device. When operating as an output device, the screen displays computer-generated images developed by the CPU 20. The LCD panel 26 also provides visual feedback to the user when one or more application software execute. When operating as an input device, the display assembly senses the position of the tip of the stylus on the viewing screen and provides this information to the computer's processor 20. Certain display assemblies can also sense the pressure of the stylus on the screen to provide further information to the CPU 20.

This embodiment accepts pen strokes from the user using a stylus or pen which is positioned over a digitizer. As the user "writes," the position of the pen is sensed by the digitizer 25 via an electromagnetic field as the user writes information to the data logger computer system. The digitizer 25 converts the position information to graphic data that are transferred to a graphic processing software of the data logger computer system. The data entry/display assembly of pen-based computer systems permits the user to operate the data logging computer system as an electronic notepad. For example, graphical images can be input into the pen-based computer by merely moving the stylus over the surface of the screen. As the CPU 20 senses the position and movement of the stylus, it generates a corresponding image on the screen to create the illusion that the stylus is drawing the image directly upon the screen. The data on the position and movement of the stylus is also provided to a handwriting recognition software, which is stored in the ROM 21 and/or the RAM 22. The handwriting recognizer suitably converts the written instructions from the user into text data suitable for saving time and expense information. The process of converting the pen strokes into equivalent characters and/or drawing vectors using the handwriting recognizer is described below.

With suitable recognition software, text and numeric information can also be entered into the pen-based computer system in a similar fashion. For example, U.S. Pat. No. 5,463,696, issued on Oct. 31, 1995 to Beernink et al., and hereby incorporated by reference, discloses a technique for analyzing and interpreting cursive user inputs to a computer, such as strokes or key depressions to the computer system. Inputs to the system are received at a user interface, such as a dual function display/input screen from users in the form of pen strokes or gestures. A database stores cursive input data strokes and hypotheses regarding possible interpretations of the strokes. Recognition of the input strokes and recognition of higher level combinations of strokes forming characters and words is performed using recognizers, or recognition domains, each of which performs a particular recognition task. A controller is provided for controlling the hypotheses database and for scheduling the recognition tasks in the recognition domains. Arbitration resolves conflicts among competing hypotheses associated with each interpretation. The recognition domains, or recognizers generate two or more competing interpretations for the same input. The recognizers use a data structure called a unit, where a unit is a set of subhypotheses together with all their interpretations generated by a single recognizer.

In Beernink, the handwriting recognizer operates at a first level for identifying one or more groups of related subhypotheses using grouping knowledge. These grouped subhypotheses generate a unit with no interpretations for each group and store the unit in the database in what is called a piece-pool memory. The Beernink recognizer has a second level of operation where each unit generated in the grouping stage is classified to provide the unit with one or more interpretations. The classified units are stored in a unit pool memory. Two or more interpretations of the input data are combined in a hierarchical structure according to a predetermined scheme in successive steps to form higher level interpretations.

Although the Beernink recognizer is flexible and does not require that the user learns special gestures, its accuracy is not perfect. Because the letters in a cursive-lettered word are connected, the recognizer must guess at how to segment the strokes into individual characters. Since ambiguities exist even in stellar samples of penmanship, cursive handwriting recognizers such as those in Beernink face a challenging task in deciphering handwritings. For example, handwriting recognizer have difficulties in trying to determine where a cursive lower-case "n" and "m" begin and end when the two letters, distinguishable from one another only by their number of humps, are strung together in a word. The handwriting recognizer tackles such ambiguities by looking in its dictionary-to determine, for instance, which words have "m" before "n" and which have "n" before "m." The user can improve accuracy by writing characters further apart than usual, but that is inconvenient and contrary to the way humans write.

Preferably, the handwriting recognizer of the present invention recognizes non-cursive characters. Unlike the Beernink approach to recognizing handwriting in which the user can print or write cursively, the non-cursive handwriting recognizer requires the user to learn to print characters in its fixed style using a basic character set, preferably a 36-character alphanumeric character set. In addition to the basic 26 letters and 10 digits, the non-cursive handwriting recognizer includes multistep pen strokes that can be used for punctuation, diacritical marks, and capitalization. Preferably, the non-cursive handwriting recognizer is a software module called GRAFFITIO, commercially available from U.S. Robotics, Palm Computing Division, located in Los Altos, Calif. Each letter in the non-cursive alphabet is a streamlined version of the standard block character—the letter A, for example, looks like a pointy croquet hoop, and the hoop must be started at the dot indicator at the lower right corner—as shown below:

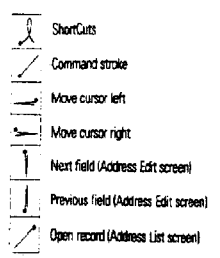

By restricting the way the user writes, the non-cursive handwriting recognizer achieves a more perfect recognition and, as with stenography, supports an alphabet consisting of characters that can be written much more quickly than conventional ones.

In a second embodiment, voice recognition can be used in conjunction with and/or replace the handwriting recognizer of the present invention. As shown in FIG. 1, a microphone 29 is connected to an analog to digital converter (ADC) 28 which interfaces with the central processing unit (CPU) 20. A speech recognizer is stored in the ROM 21 and/or the RAM 22. The speech recognizer accepts the digitized speech from the ADC 28 and converts the speech into the equivalent text. As disclosed in U.S. application Ser. No. 08/461,646, filed Jun. 5, 1995 by the present inventor and hereby incorporated by reference, the user's speech signal is next presented to a voice feature extractor which extracts features using linear predictive coding, fast Fourier transform, auditory model, fractal model, wavelet model, or combinations thereof. The input speech signal is compared with word models stored in a dictionary using a template matcher, a fuzzy logic matcher, a neural network, a dynamic programming system, a hidden Markov model (HMM), or combinations thereof. The word model is stored in a dictionary with an entry for each word, each entry having word labels and a context guide. Next, a word preselector receives the output of the voice feature extractor and queries the dictionary to compile a list of candidate words with the most similar phonetic labels. These candidate words are presented to a syntax checker for selecting a first representative word from the candidate words, as ranked by the context guide and the grammar structure, among others. The user can accept or reject the first representative word via a voice user interface. If rejected, the voice user interface presents the next likely word selected from the candidate words. If all the candidates are rejected by the user or if the word does not exist in the dictionary, the system can generate a predicted word based on the labels. Finally, the voice recognizer also allows the user to manually enter the word or spell the word out for the system. In this manner, a robust and efficient human-machine interface is provided for recognizing speaker independent, continuous speech and for converting the verbal instructions from the user into text data suitable for capturing time and expense information.

The computer system is also connected to one or more input/output (I/O) ports 27 which allows the CPU 20 to communicate with a host computer for data archival purposes. Each of the I/O ports 27 may be a parallel port, a serial port, a PCMCIA port, or alternatively, a proprietary port to enable the computer system to dock with the host computer. After docking, the I/O ports 27 and software located on the host computer supports the automatic synchronization of data between the data logging computer system and the host computer. During operation, the synchronization software runs in the background mode on the host computer and listens for a synchronization request or command from the data logging computer system of the present invention. Changes made on the data logging computer system and the host computer will be reflected on both systems after synchronization. Preferably, the synchronization software only synchronizes the portions of the files that have been modified to reduce the updating times.

Turning now to the time and billing information collection and reporting aspects of the data logging computer system, the present invention accumulates information via data-entry screens that are intuitive and easy to understand to help the user capture information quickly and efficiently. As discussed above, the relational database in the RAM 22 stores all data entered into the computer via the data-entry screens. The database supporting the time and billing system also integrates its data with other systems such as a calendar, to-do lists, Rolodex-type information, information about clients and pending matters, among others. Additionally, the data logging system of the present invention generates standard reports which provide useful statistics and information to the user. Upon initializing the billing and expense database, the routines of the present invention request client's name, address, a unique client number and a list of the matters associated with each client. For the matter file, the routine requests the matter title, fee arrangement (e.g., an hourly matter, and the rate) and the outstanding balance forward. The information is entered in FIGS. 2 and 3.

Figure 2:
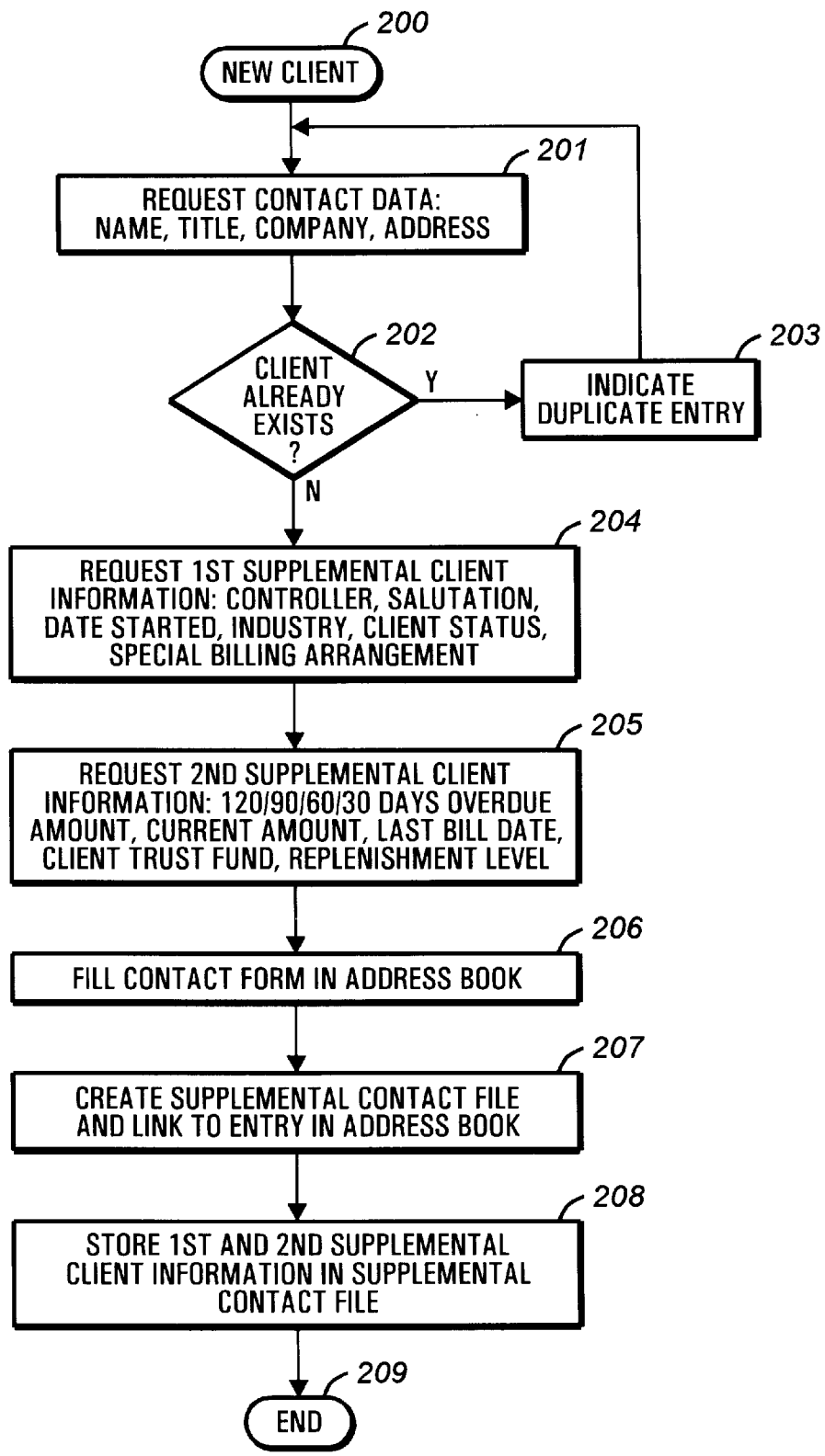
FIG. 2 is a flowchart illustrating the process for adding a new client.

Referring now to FIG. 2, the process for adding a new client is disclosed. Upon beginning the process in step 200 of FIG. 2, the routine requests contact data such as name, title, company and address and prepare the information for ultimate storage in a contact record. The routine further notes in the contact file that the present contact record is that of a client or a potential client to distinguish the record from other contact records such as personal contacts. In step 202, the routine checks to see if the client already exists in its records. If so, the routine indicates that a duplicate entry has been requested in step 203 before it loops back to step 201 to receive the next client to be added.

Alternatively, from step 202, if records of the client are not already in the database, the routine requests a first supplemental client information in step 204. The first supplemental information include: controller contact name, salutation, date started, industry, client status, referral source, special billing arrangement, and client alphanumeric code. The alphanumeric client code, which can either be selected by the user or be automatically assigned by the computer system, facilitates searching for a particular client and further speeds up data entry. If necessary, the present contemplates that information entered in step 204 can be used to perform a conflict check, as is known to those skilled in the art. Further, the present invention contemplates that the information requested in step 204 can be used to run a background check with respect to the client's prior litigation history with its service providers and financial condition prior to accepting the client, as is known in the art.

Next, the routine requests a second supplemental client information in step 205. These information include the amounts associated with overdue bills in 120 days, 90 days, 60 days, and 30 days. The information also include the current billing amount, the last bill date, the client trust fund amount, and the replenishment level where the client is to be notified to update the retainer amount, among others.

In step 206, the data recorded from step 201 are entered into the address book record. Next, in step 207, the routine creates a supplemental contact file and appropriate links the supplemental contact file with the contact file record in the address book. Finally, in step 208, the first and second supplemental client information is stored in the supplemental contact file created in step 207 before exiting in step 209. Hence, as shown in FIG. 1, a new client and related information can be added to the existing data base.

Figure 3:
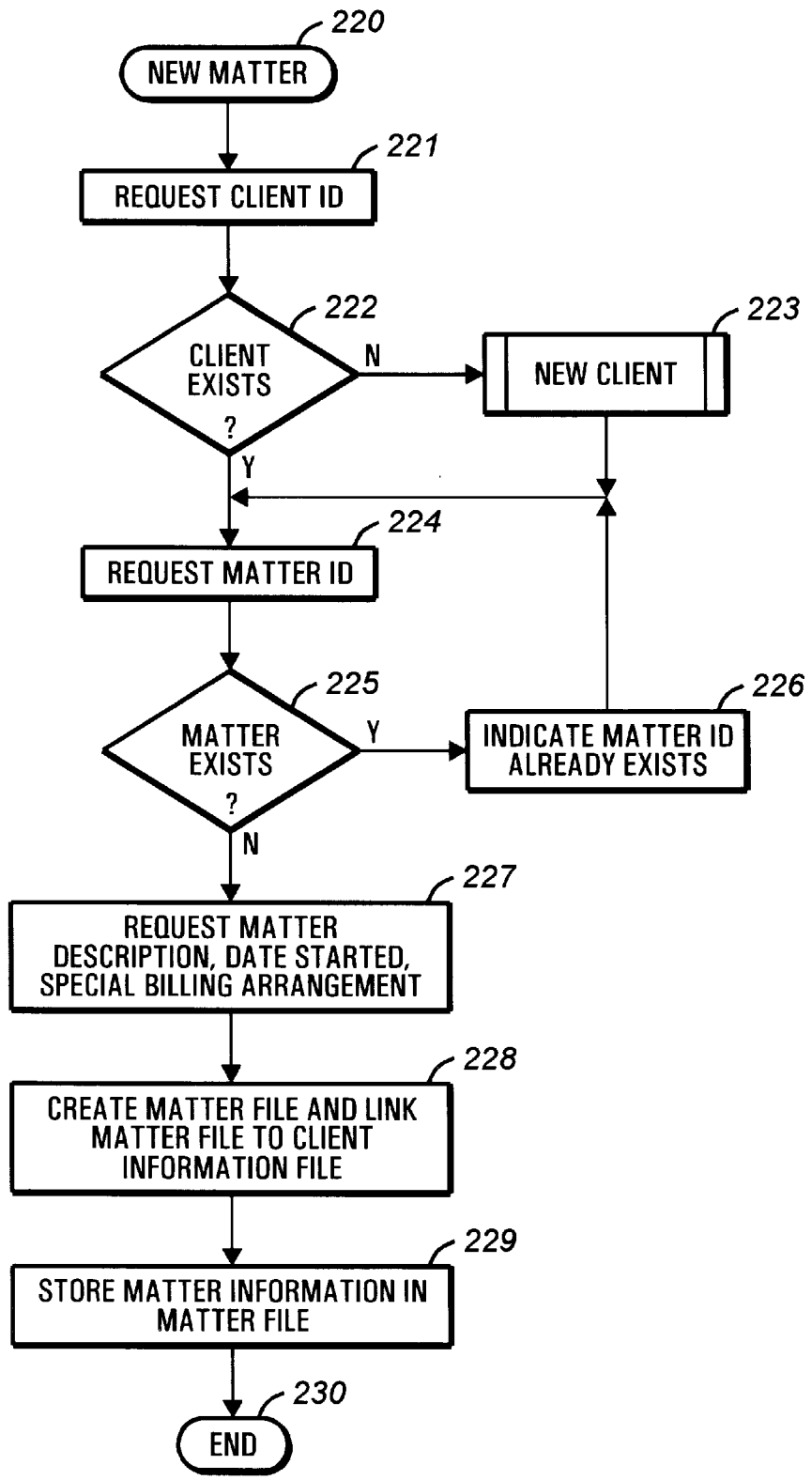
FIG. 3 is a flowchart illustrating the process for adding a new matter for the client file of FIG. 2.

Referring now to FIG. 3, the process for adding a new matter for an existing client is shown. From step 220 of FIG. 3, the routine requests the user to enter a client identification (ID) in step 221. The client ID is checked in step 222. If the client does not exists, a new client record is added in step 223. From step 222 or 223, the routine proceeds to step 224 where the matter ID is requested. The matter ID is also checked against the database in step 225. If the matter has already been opened, the routine indicates that the matter ID already exists in step 226 before it loops back to step 224 to request the user to enter a new matter ID that has not already been used.

From step 225, if the request matter does not exist in the database, the routine requests the user to enter relevant matter information, including the matter description, date started, and special billing arrangement, among others. Next, in step 228, the routine creates the matter file and links the matter file to the client information file. In step 229, the routine then stores the matter information in the newly created matter file of step 228. Finally, the routine exits in step 230.

Figure 4:
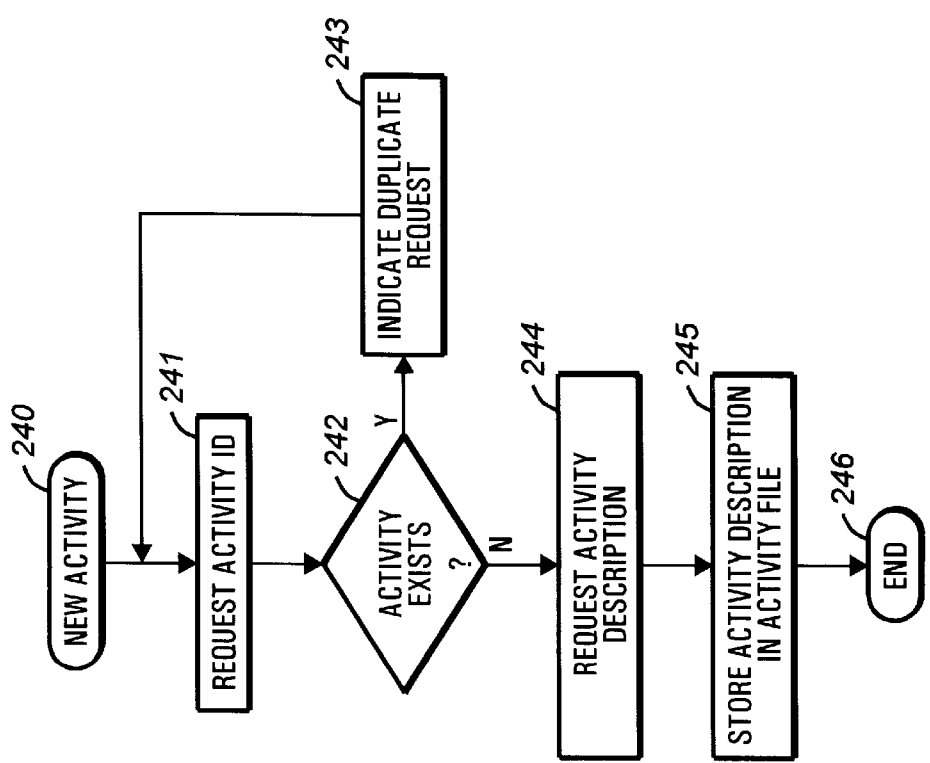
FIG. 4 is a flowchart illustrating the process for adding a new activity.

Turning now to FIG. 4, the routine to add a new activity record is shown. In FIG. 4, the routine requests the activity ID in step 241. Next, in step 242, the activity ID is checked against the database to see if it already exists. If so, the routine indicates that the user has requested a duplicate activity ID in step 243 before it loops back to step 241 to request the user to enter another activity ID. Alternatively, if a new activity record is to be added, as detected in step 242, the routine requests the description of the activity in step 244. The routine then stores the activity description in the activity file in step 245 before the routine exits in step 246. Thus, via the activity ID, the routine allows the user to code and identify particular groups of activities for ease in classification. For instance, the user could code the matter types such as "CRI" for criminal or "CIV" for civil matters, "CON" for contingency matters, among others. Further, specific details such as tasks can be supplemented such as court appearances, court filings client/other meetings, deadlines, and follow-throughs. Coding of the matters can also be used to easily select a particular group of matters for billing or for reporting information. For example, if the user wanted to bill only clients involved with civil matters, he or she would be able to instruct the computer to bill just the "CIV" matters.

Additionally, corporate clients have begun to seek more meaningful billing data and, to this end, have imposed on service providers various task-based invoicing requirements where the bill is organized or sorted by the task performed. Instead of describing billed work under the summary terms, "for services rendered," or chronologically by day and by the individual, a task-based billing system tells the client which individuals worked for how long on certain tasks. The task-based billing capability can produce a much more detailed form of invoice than the more usual chronological format, and consequently may require considerably more effort to generate and maintain. Further, the effective use of a billing system for management purposes requires not only good data but timely data, as task-related fee information is not useful in proactive management if that information does not arrive in the manager's hands until two or three months after the work has been done. For this reason, some corporate clients have asked for on-line access to preliminary billing data on a weekly or bi-weekly basis, before the employer's accounting department generates the formal invoice. This kind of "quick look" billing system has stressed the traditional time and billing systems. The present invention's activity ID in FIG. 4 can be used to support the task-based invoicing requirements. Operational codes, for instance, are typically assigned to elaborate series of tasks pre-defined by the client. Thereafter, the timekeeping system often requires the service provider to categorize his or her time to a number of discrete, separately pigeonholed work projects using the activity ID of FIG. 4.

Figure 5:
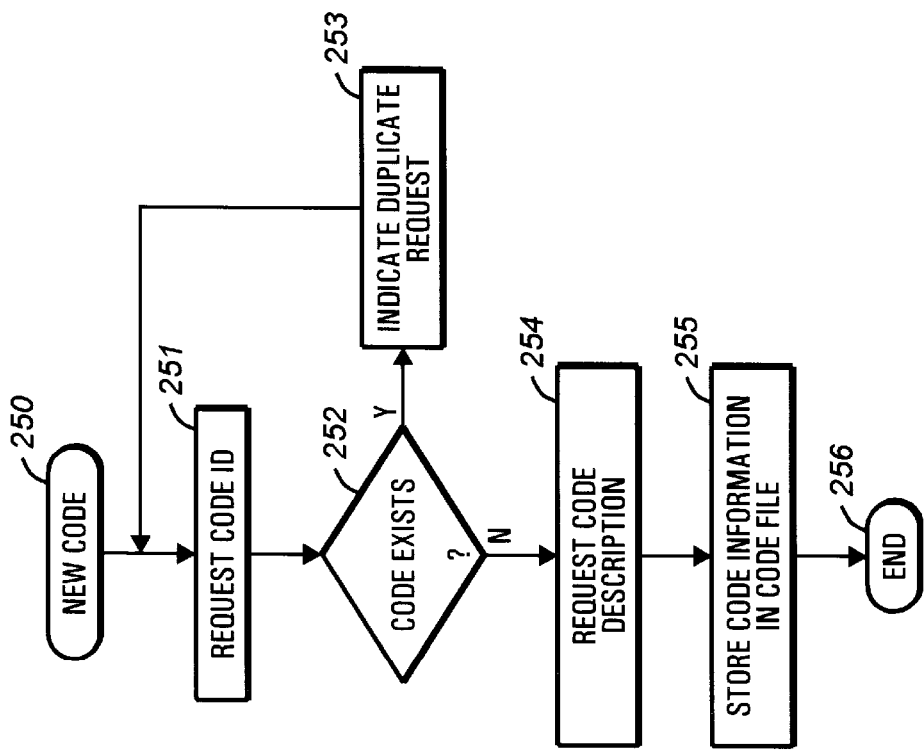
FIG. 5 is a flowchart illustrating the process for adding a new shorthand code.

Turning now to FIG. 5, the routine to add a new shorthand code record is shown. The shorthand codes are similar to word processing macros where recurring or frequently used expressions are represented using a "shorthand" code. Preferably, an alphanumeric code is used rather than a numeric code as it is easier to remember than a numeric code. Thus, instead of typing "Conference with Client" over and over again, the user can set up "CC" as the shorthand code for the same label. For instance, a specialist lawyer such as a patent attorney may use "PP" and "ROA" as short-hands for patent preparation and response to office action, respectively.

FIG. 5 ensures the integrity of the shorthand code database by ensuring that a new code does not overlap with an existing code. In FIG. 5, the routine requests the code ID in step 251. Next, the code ID is looked up in the database to see if it already exists. If so, the routine indicates that the user has requested a duplicate code ID in step 253 before it loops back to step 251 to request the user to enter another code ID. Alternatively, if a new code record is to be added, as detected in step 252, the routine requests the description of the abbreviated code in step 254. Further, the routine stores the description of the code in the code file in step 255 before it exits in step 256. In this manner, the new shorthand code is checked before it is added to the database. During operation, when the user writes a shorthand code, the description requested in step 254 is substituted in place of the abbreviation during the generation of reports, thus providing a quick and convenient mechanism to enter repetitive phrases. In addition to speeding the user's data entry and minimizing typographical errors, the use of abbreviated codes also reduces the data storage requirement of the work description.

Figure 6:
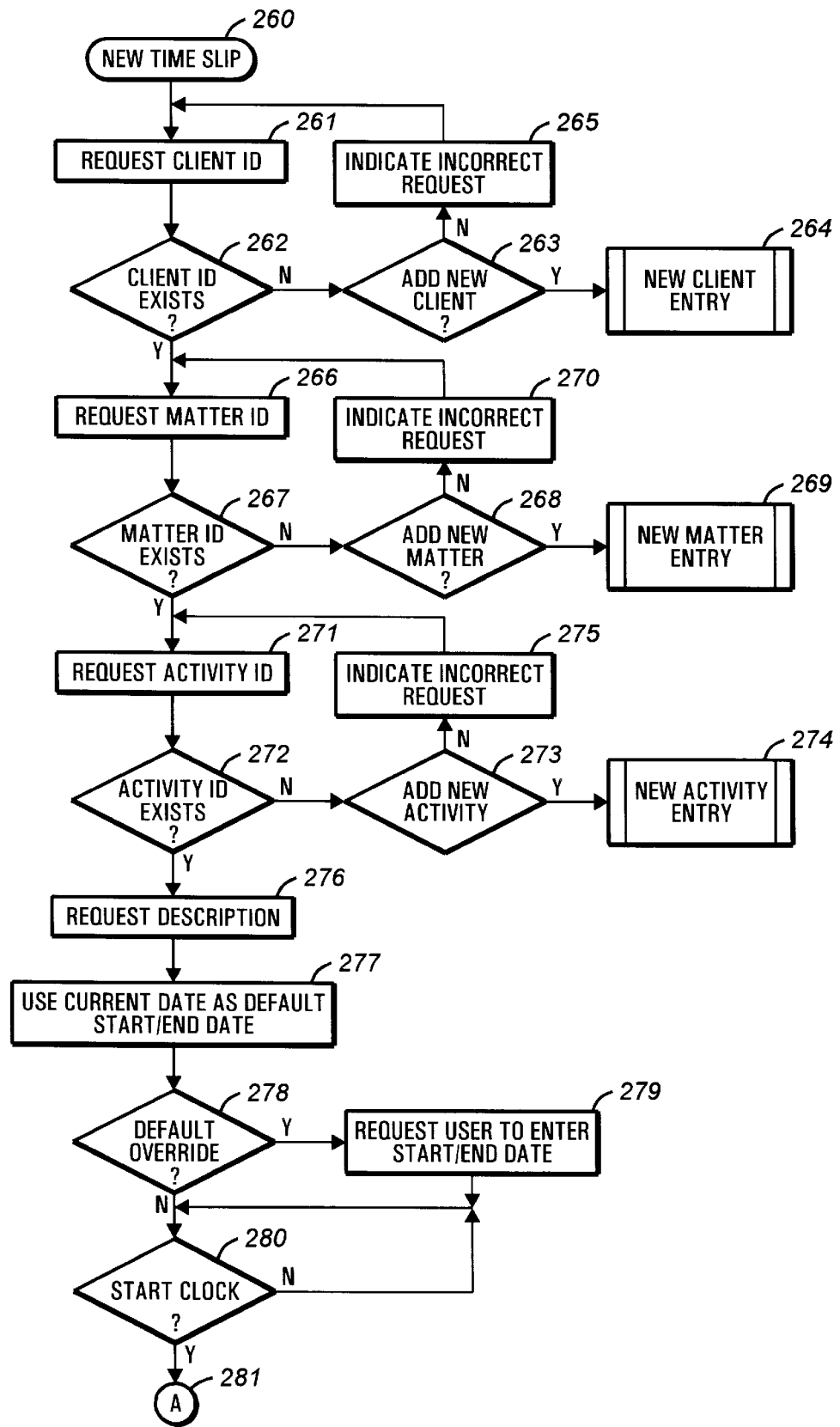
FIGS. 6 and 7 are flowcharts illustrating the process for adding a new time slip for the matter of FIG. 3.

Referring now to FIG. 6, the routine to add a new time slip is shown. A new time slip is entered for every new task or project that is to be billed to the client. Beginning with step 260 of FIG. 6, the routine requests the client ID and the matter ID for each task to be performed. In step 261, the client ID is requested. The client ID is checked in step 262. If the client ID does not exist in the database records in step 262, the routine checks whether or not a new client is to be added in step 263. If so, the routine proceeds to step 264 to add a new client, as discussed in FIG. 2. Alternatively, from step 263, if the entry is simply a typographical error, the routine notifies the user that an incorrect client ID has been entered in step 265. The routine then loops back to step 261 to request a new client ID.

From step 262, if the client ID is correct, the routine requests the matter ID in step 266. In step 267, if the matter ID does not exist in the database, the routine checks to see if the user wishes to create a new matter record in step 268. If so, the routine proceeds to add a new matter entry in step 269, as discussed in FIG. 3. Alternatively, from step 268, if the entry is a mistake, the routine indicates an error to the user in step 270 before it loops back to step 266 to request another matter ID.

Next, if the matter ID exists in step 267, the routine next requests an activity ID from the user in step 271. The activity ID is an optional information that generically categorizes the type of work being performed for reporting purposes. From step 271, the routine checks to see if the entered activity ID is valid or not in step 272. If not, the routine checks to see if the user wishes to add a new entry to the list of activities in step 273. If so, the routine adds the new activity in step 274 as shown in FIG. 4. Alternatively, if the user does not wish to add a new activity entry, the routine notes in step 275 that the entry is incorrect and requests a new activity ID in step 271.

From step 272, the routine then requests a description of the work being performed in step 276. The description may be a full text entry, or may have one or more shorthand codes, as discussed above. When the user writes the shorthand code, the description corresponding to the shorthand code is substituted in place of the abbreviation during the generation of reports, thus providing a quick mechanism to enter repetitive phrases. In addition to speeding the user's data entry, the use of abbreviated codes also reduces the data storage requirement of the work description file while minimizing the typographical errors associated with the writing of the entire phrase.

The description request of step 276 can be spell-checked using a dictionary as conventionally done. However, to keep memory usage to a minimum and to provide real-time data checking capability, step 276 further incorporates a spell-checking process using a cache where each word is checked against a list of the most frequently used words in the RAM 22, as described in FIG. 8. If the word as entered is incorrectly spelled, the routine selects the closest word in the cache as a suggested replacement. In this manner, the present invention performs a responsive spell-check in real time using minimal computing resources.

From step 276, the routine applies the current date as the default start/end date for the task being performed. In step 278, if the user overrides the default dates, the routines accepts the start date and end date from the user in step 279. In the event that the user does not override the default dates, or from step 279, the routine proceeds to step 280, where the routine checks to see if the user has started the clock. If not, the routine loops back to itself to wait for the start clock button to be pushed. Once the user has started the clock, the routine proceeds to the connector A 281 which bridges FIG. 6 and FIG. 7.

Figure 7:
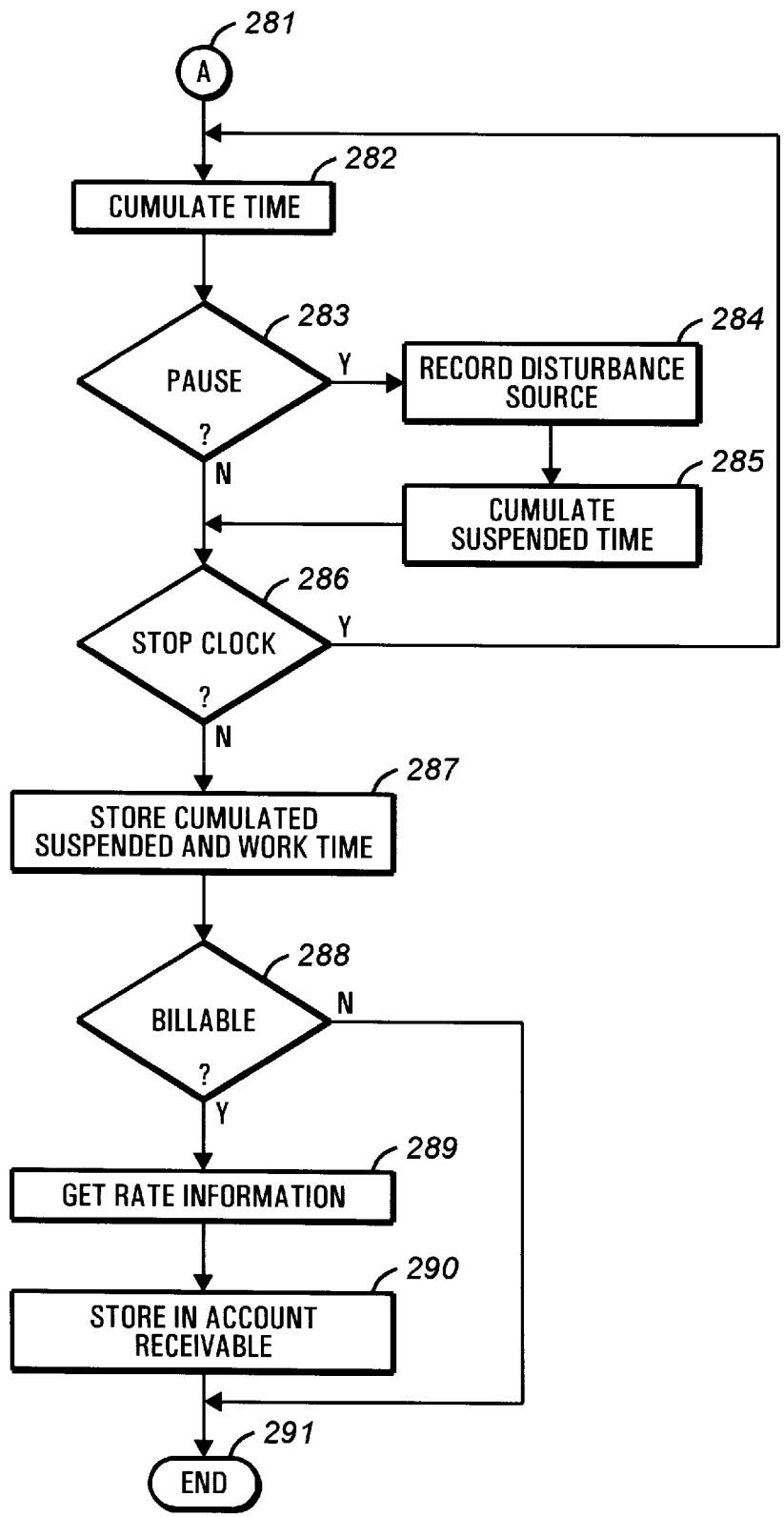

Turning now to FIG. 7, which is a continuation of FIG. 6, the routine to process the time slip is shown. From the connector A 281 of FIG. 6, the routine proceeds to step 282 where the time spent on the task is cumulated. This is done by setting the timer portion of the clock/timer 23 into the active state to enable the duration count register to increment. In step 283, the routine checks to see if the pause button has been pressed or not. If pressed, the routine proceeds from step 283 to step 284 where the routine optionally records the source of the disturbance for subsequent user analysis. Further, from step 284, the routine proceeds to step 285 where the timer portion of the clock/timer 23 is placed into the suspended state where the duration count register is maintained. Although the duration count register is halted in step 285, the present invention contemplates the cumulation of the time spent in the suspended state using a suspended count register in the event the user wishes to collect information relating to the time suspensions.

From step 283 or step 285, the routine checks to see if the stop clock button has been pressed by the user in step 286. If not, the routine simply loops back to step 282 to continue cumulating the work time. Alternatively, the routine proceeds to step 287 if the stop clock button has been pressed. In step 287, the routine stores the cumulated suspended time of step 285 and the cumulated duration count time of step 282 which represents the time spent on the particular task. The resulting time may be subject to a minimum billable time round-off, where the time is rounded up to the nearest reported time slice in accordance with the user's billing policy.

From step 287, the routine receives optional inputs from the user as to whether the time spent is billable or not in step 288. If not, the routine simply records the time spent for analysis and exits to step 291. If the time spent is billable in step 288, the routine retrieves the appropriate rate information from either the client information file or the matter information file and multiplies the retrieved rate with the time spent to arrive at the bill to the client on the particular matter worked on. The financial data is stored in the account receivable file of the data logging computer system of the present invention for subsequent uploading to the accounting system on the host computer.

Figure 8:
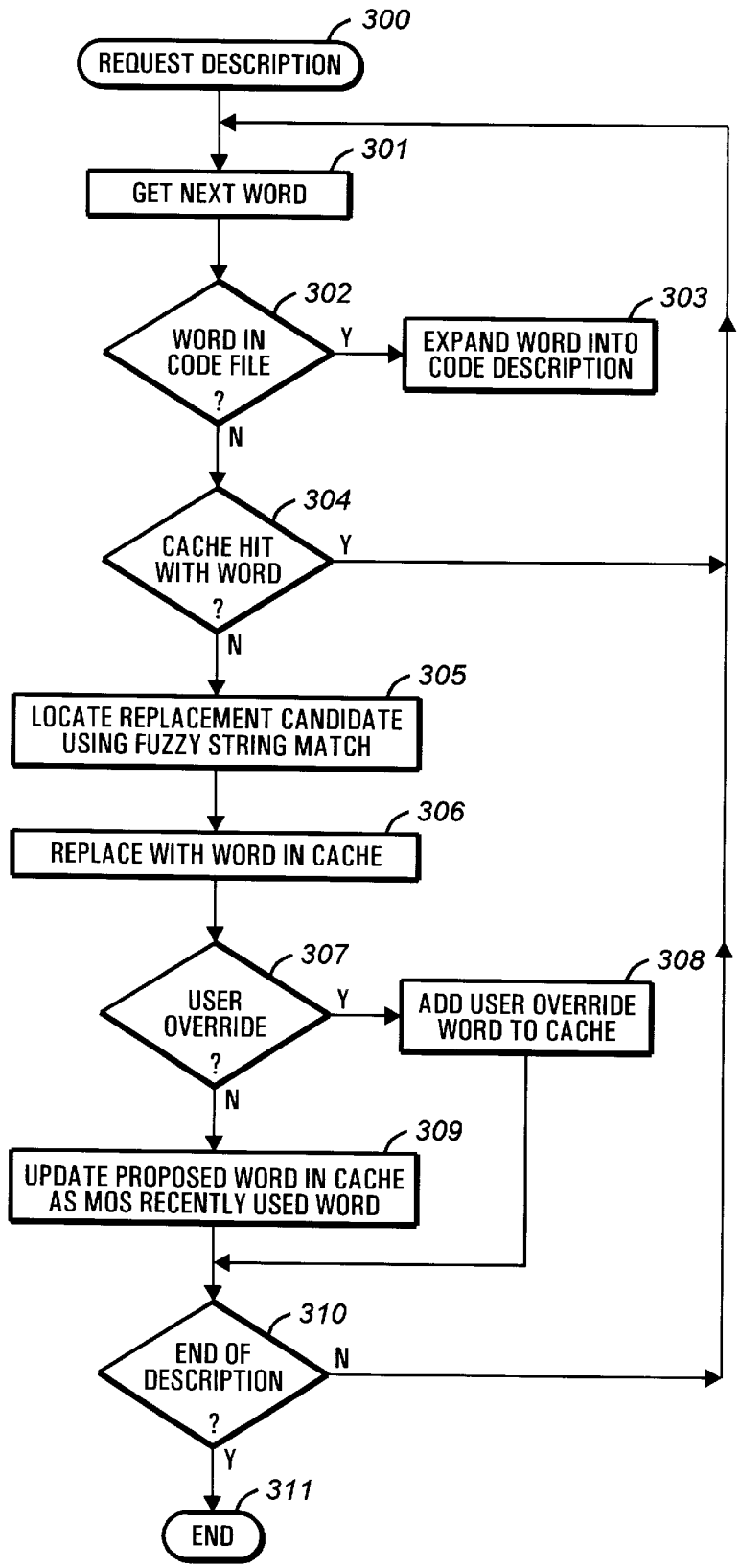
FIG. 8 is a flowchart illustrating the operation of a cache in spell-checking entries in a description field.

Referring now to FIG. 8, the routine to spell-check words entered in the description of FIG. 6 is shown in more detail. In FIG. 8, after the user has entered each word describing the task being worked on, the routine retrieves the word previously entered in step 301. Next, the routine checks in step 302 to see if the word exists in the short-hand code file or not. If the word exists in the code file, the routine retrieves the description of the code and expands the code into one or more descriptive terms in step 303. Next, as the descriptive terms are presumed to be correct, no spell-checking is performed and the routine simply loops back to step 301 to get the next word.

Alternatively, if the word does not exist in the short-hand code file in step 302, the routine performs a look-up in a cache containing the vocabulary in step 304. Preferably, the cache of step 304 maintains an active vocabulary of 1,000 words. Further, the word cache of step 304 is preferably searched using a high speed hash search which is known to those skilled in the art, although other search mechanisms such as binary search, quick search and sequential search systems can be used as well. The cache of step 304 has two components: a data component, a status component, and a link component. Preferably, the word cache is implemented as a double-ended queue which is ordered according to the most recently used word. Further, in the event that a word needs to be added to the word cache, the least recently used cell of the cache is selected and appropriately updated with the new word and its status updated as the most recently used word. The thus disclosed word cache maximally uses storage space as only the most frequently used word is stored.

From step 304, if the word generates a cache hit, the word is accepted as being correct and the routine simply updates the status of the entry in the word cache bearing the current word as the most recently word before it loops back to step 301 to check the next word. Alternatively, if step 304 results in a cache miss, the routine identifies a replacement candidate in the word cache in step 305. The replacement candidate may be identified using a number of methods known to those skilled in the art. Preferably, step 305 uses a fuzzy string matcher to detect the replacement candidate in step 305. In fuzzy string matching, the potentially misspelled word is subdivided into sets of N adjacent characters, or N-grams. The frequency with which each of the N sets of adjacent characters occurs in the word is stored in a first N-gram count array. The first word stored in the word cache is then also subdivided into N-grams. As each update is made to the second array, a corresponding update to the difference in frequencies between the two arrays. The sum of the differences in frequencies determines the holographic distance between the potentially misspelled word and the word in the cache. The process is repeated for each word in the cache. In this manner, the holographic as well as the distance metric of the potentially misspelled word is consulting in looking up the closest entry in step 305.

From step 305, the routine checks for a user-override in step 307. If the user overrides the proposed word of step 306, the routine adds the new word as the most recently used entry of the word cache in step 308 before it processes the next word in step 310. Alternatively, if the user accepts the proposed word in step 307, the routine updates the entry in the word cache corresponding to the proposed word as the most recently used word in the cache in step 309. From step 309 or step 308, the routine proceeds to step 310 where it checks to see if all words have been spell-checked. If not, the routine loops back to step 301 to process the next word in the description. Alternatively, if each word in the description has been checked in step 310, the routine exits in step 311.

Figure 9:
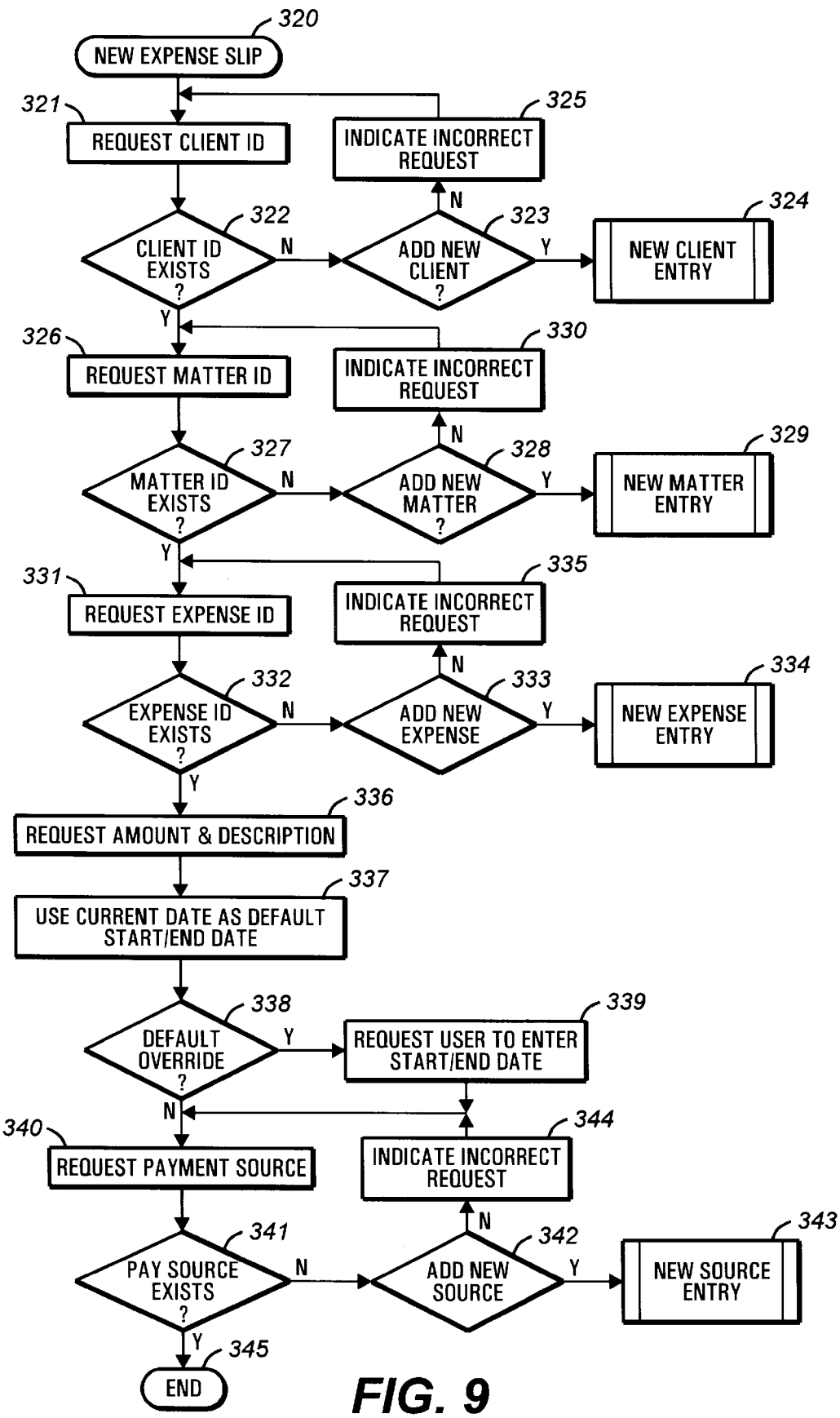
FIG. 9 is a flowchart illustrating the process for adding a new expense slip for the matter of FIG. 3.

Referring now to FIG. 9, the routine to enter a new expense slip is shown. From step 320 of FIG. 9, the routine requests the client ID and the matter ID for each task to be performed. In step 321, the client ID is requested. The client ID is checked in step 322. If the client ID does not exist in step 322, the routine checks whether or not a new client is to be added in step 323. If so, the routine proceeds to step 324 to add a new client, as discussed in FIG. 2. Alternatively, from step 323, if the entry is simply a typographical error, the routine notifies the user that an incorrect client ID has been entered in step 325. The routine then loops back to step 321 to request a new client ID.

From step 322, if the client ID is correct, the routine requests the matter ID in step 326. In step 327, if the matter ID does not exist in the data base, the routine checks to see if the user wishes to create a new matter record in step 328. If so, the routine proceeds to add a new matter entry in step 329, as discussed in FIG. 3. Alternatively, from step 328, if the entry is a mistake, the routine indicates an error to the user in step 330 before it loops back to step 326.

Next, if the matter ID exists in step 327, the routine next requests an expense ID from the user in step 331. The expense ID is an optional information that categorizes broadly the type of work being performed. The expense ID code broadly decodes the type of expense being incurred, such as copying expense, facsimile expense, reporting fees, and various travel related expenses such as hotel, meals, auto, travel, rental, phone, entertainment, among others. From step 331, the routine checks to see if the entered expense ID is valid or not in step 332. If not, the routine checks to see if the user wishes to add a new entry to the list of expenses in step 333. If so, the routine adds the new expense in step 334 in a process similar to that shown in FIG. 4. Alternatively, if the user does not wish to add a new expense entry, the routine notes in step 335 that the entry is incorrect and requests a new expense ID in step 331.

From step 332, if the expense ID exists, the routine requests the quantity, amount, attendee and description in step 336. The routine further requests the payment codes which categorizes the method for paying the expense item. The payment code records the types of payment such as cash, check, common credit cards (American Express, Visa, Mastercard, among others). Where appropriate, the routine also checks for the type of currency and the exchange rate necessary to translate the expense amount into the native currency amount of the user. Additionally, in the event that the expense type is meal or entertainment types, the routine provides a default IRS allowance of 80%. This user can override the default stored in this field such that future meals or entertainment expenses default to the user entered IRS allowance. Further, in the event of the expense is related to the automobile, the routine provides a default company reimbursed per mile basis which is equal to the IRS self-employed per mile basis. However, the user can override this rate and such override will be used from that point forward. Additionally, for auto related expenses, the routine records the trip record, as required by the IRS to substantiate the business use of a private car, which according to the IRS includes the date, city, company, attendees, purpose of meeting, and mileage.

The description spell-checking process of FIG. 8 is also used in step 336 of FIG. 9. Next, the routine uses the current date as the default start and end dates in step 337. The routine checks to see if the user overrides the default dates of step 337. If the user chooses to override the default rate in step 338, the routine requests the user to enter the new start/end dates in step 339. From step 338 or 339, the routine next requests the payment source in step 340. The payment source is also verified in step 341, and if correct, the payment source is accepted. From step 341, the routine checks to see if the entered payment source is valid or not in step 342. If not, the routine checks to see if the user wishes to add a new entry to the list of payees in step 343. If so, the routine adds the new payee in step 344 in a process similar to that of FIG. 4. Alternatively, if the user does not wish to add a new payee entry, the routine notes in step 355 that the entry is incorrect and request a new payee Id in step 341. Otherwise, if the data entered is correct, the routine saves the entered data in step 344. Finally, the routine exits the expense entry process in step 345.

Figure 10:
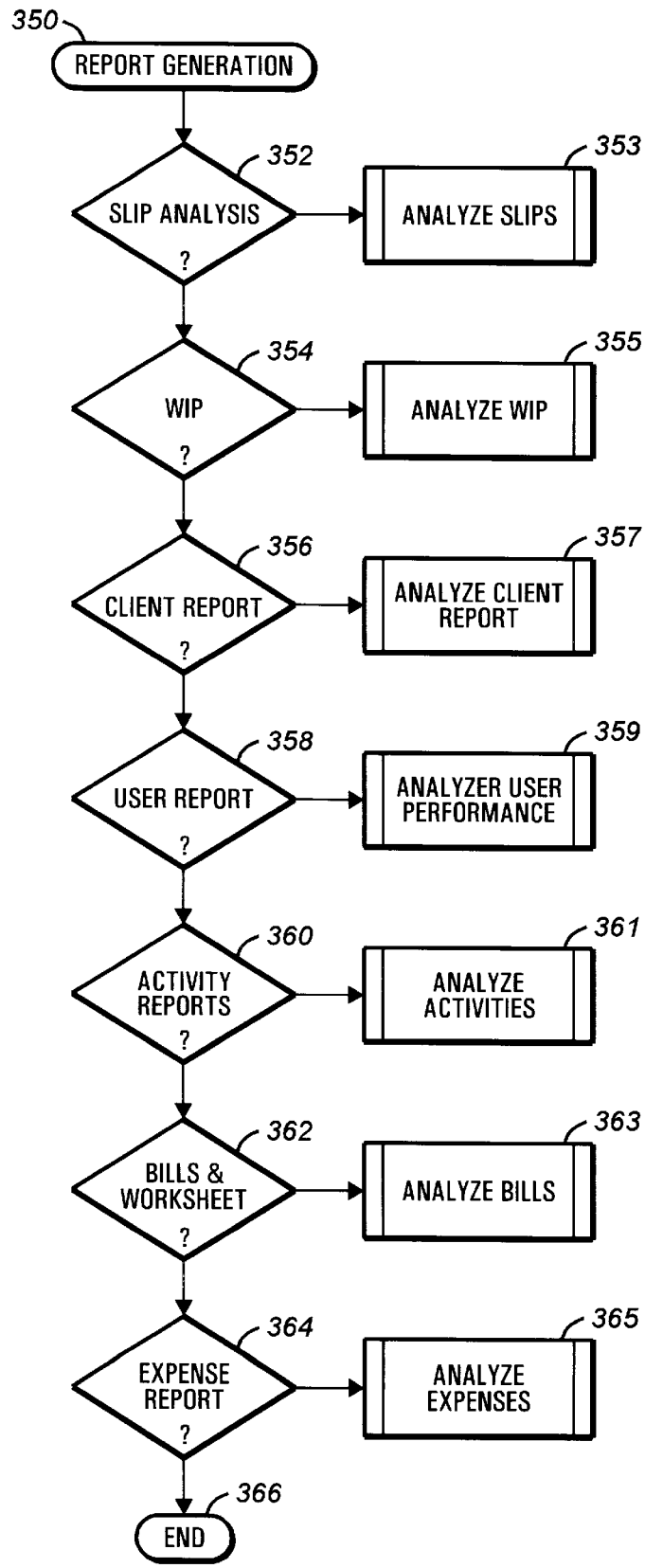
FIG. 10 is a flowchart illustrating the process for generating reports based on data logged by the present invention.

Turning now to FIG. 10, the routine to generate time and expense reports is shown. In FIG. 10, from step 350, the routine checks to see if the user has requested a time-slip analysis in step 352. If so, the routine jumps to the routine 353 which generates time-related reports. The routine 353 provides the user with a comprehensive report of the user's time entries during a predetermined period, as sorted by time, client, and matter ID. The routine 353 provides a gauge of the time worked thus far by the user, as well as a breakdown of the work hours by subject matter.

Alternatively, if the slip analysis is not requested in step 352, the routine checks to see if the user has requested a work-in-process (WIP) report in step 354. If the user has requested such report, the routine jumps to the routine 355 which analyzes WIPs. The routine 355 summarizes the work performed to date since the last billing cycle. The WIP report can also remind the user of the work performed thus far during the current billing cycle. The WIP report thus provides feedback to the user as to whether he or she has devoted too much or too little resources to the client during the current billing cycle.

Alternatively, if the WIP analysis is not requested in step 354, the routine checks to see if the user has requested a client report in step 356. If the user has requested such report, the routine jumps to the routine 357 which analyzes client reports. The client report provides a global view of all activities performed during the selected time periods. The activities is sorted according to the time order and also by matter.

Alternatively, if the client report is not requested in step 356, the routine checks to see if the user has requested a user report in step 358. If the user has requested such report, the routine jumps to the routine 359 which analyzes user activities. The user reports assist the user in becoming more efficient. For example, the billing system tracking hours spent by attorneys and staff on various matters can be used to calculate an average cost for specific types of cases. The invention thus can be used to determine what fees to charge and predict profitability.

Alternatively, if the user analysis is not requested in step 358, the routine checks to see if the user has requested an activities report in step 360. If the user has requested such report, the routine jumps to the routine 361 which analyzes activities performed on behalf of clients. The client activity report simply summarizes the time worked on behalf of the client, as broken down by the matter number and sorted by date.

Alternatively, if the client analysis is not requested in step 360, the routine checks to see if the user has requested a billing/worksheet report in step 362. If the user has requested such report, the routine jumps to the routine 363 which analyzes billing statements. The routine also generates a prebill or a draft version of the final bill and is used for editing and review purposes. It contains more information and detail than the actual bill. Typically, prebills are submitted to the billing attorney, who then makes any corrections. Be sure these are returned to the billing clerk in a timely fashion. A pre-billing summary report should help track the outstanding prebills.

Alternatively, if the billing analysis is not requested in step 362, the routine checks to see if the user has requested an expense report in step 364. If the user has requested such report, the routine jumps to the routine 365 which analyzes expenses. The reports of routine 365 provides details of expenses on a periodic basis, such as daily, weekly or monthly. The routine 365 further calculates the totals for the user, sorted by date and then by expense categories or codes. Such reports are submitted to the accounting department, along with receipts for expense reimbursements. The routine 365 further provides a tracking report which compares the reimbursements received with the submitted reimbursement requests. The comparison thus determines which expense reimbursement requests have been processed and the distribution of the reimbursement into the business related expenses verses the personal expenses. The routine 365 thus tracks the outstanding expenses that is owed the user.

The disclosed report generator of the time and expense system of the present invention allows the user to generate reports that can help improve productivity (i.e., services billed for each service provider such as a lawyer or each client matter, comparative reports from one period to another, preparation of budgets, a listing of current assets, liabilities and equity, aging reports, customer balances). The reports provided by the system can determine which cases earn the most profit for the company, or which client relationships are more profitable than others. These reports may indicate that the service provider's hourly rate needs some adjustment, or they may locate areas where productivity can be increased. Thus, in the event where the employer is a law firm, the report may indicate that a partner is charging for research that an associate could have done, or the lawyer is charging for the drafting of documents that could have been prepared by the legal assistant.

Figures 11, 12:
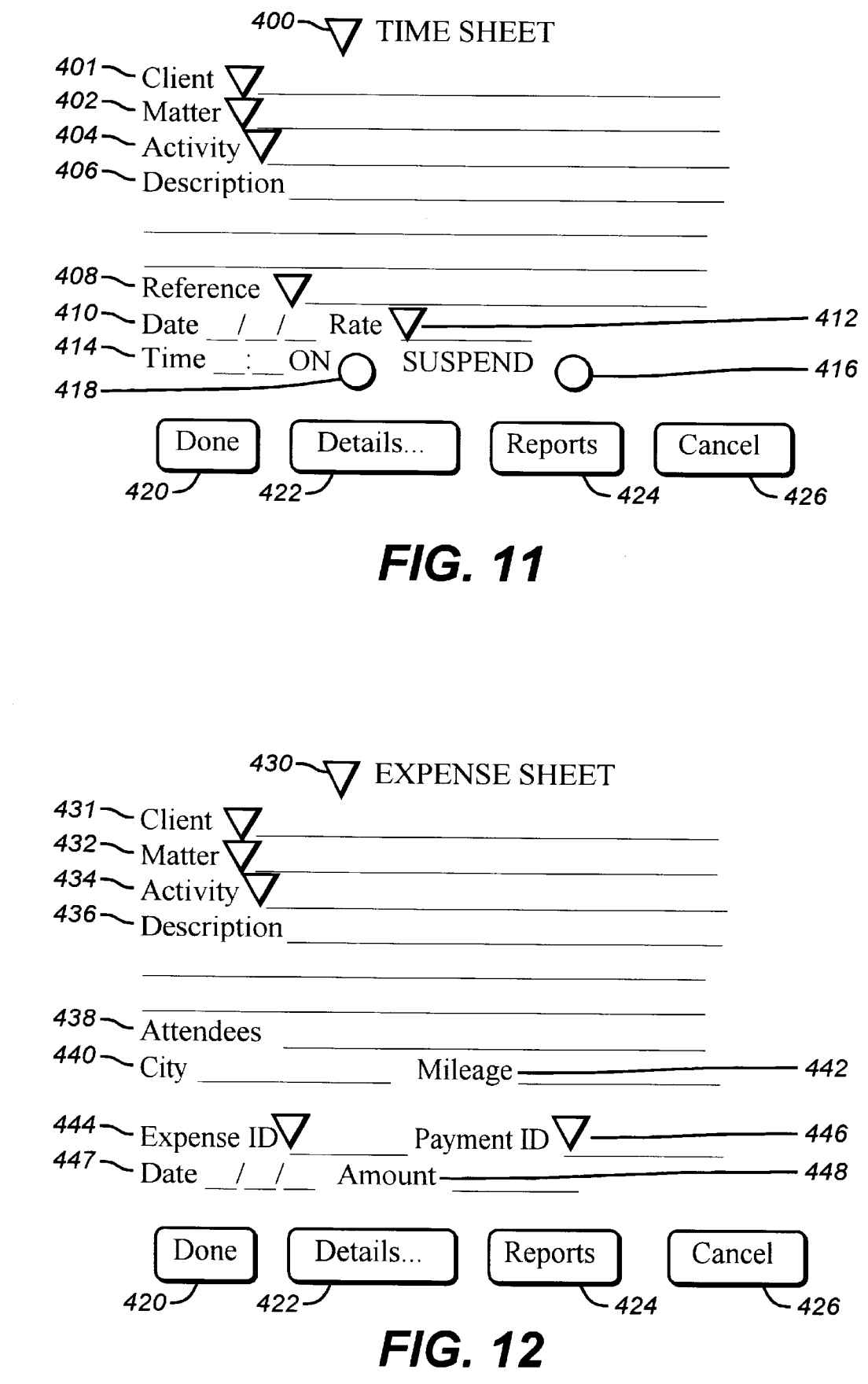

Turning now to FIGS. 11 and 12, the user interfaces for the screens accepting the time slips and the expense slips from the user are shown. In FIG. 11, the triangle of element 400 is a selection box which provides the user with the option of tracking time sheet or expense sheets, or slips. Upon depressing the triangular selection box 400 using a suitable pen, a menu pops up which allows the user to select either the time sheet option or the expense sheet option. In the event that the user wishes to track time sheets, the screen of FIG. 11 is shown. Alternatively, when the user wishes to track expenses, the screen of FIG. 12 becomes active.

Referring to the diagram of FIG. 11, a number of data entry fields and options are shown. In FIG. 11, the client field 401 has a triangular selection box, indicating that the user can retrieve the client identification from the menu provided by the triangular selection box. Preferably, the triangular selection box 401 lists the five most recently worked with clients. In addition to the selection box, the user can also directly enter the client identification using the speech recognizer or the handwriting recognizer. Similarly, the matter field 402 and the activity field 404 can be entered directly, or can be selected from the list shown when the triangular selection boxes associated respectively with fields 402 and 404 are activated.

Next, an annotation of the task being worked on can be entered in the description field 406. Preferably, the cache error corrector of FIG. 8 is applied to spell-check the annotation being entered into the description field 406. Next, the reference field 408 can be entered directly, or can be selected from the list shown when the triangular selection boxes associated with the field 408 is activated. The date information can be automatically entered by the computer system into a date field 410, or alternatively, the date information can be entered by the user into the field 410. Next, the billing rate information is entered into a rate field 412. Alternatively, the rate information can be selected by picking one of the choices when the triangular selection box associated with the field 412 is selected.

Next, the cumulative time spent on the task is updated in a time field 414. The time field 414 is associated with two buttons 416 and 418. These two buttons 416 and 418 interact with the user to alternatively set the timer portion of the clock/timer 23 into the active mode or the suspended mode. To provide feedback to the user, whenever the clock/timer 23 is in the active mode, a darkened circle is shown concentrically within the ON button 418. Alternatively, when the clock/timer 23 is in the suspended mode, a darkened circle is shown concentrically within the SUSPEND button 416.

In addition to the fields for accepting data entry from the user, the screen of FIG. 11 also has four buttons which interact with the user. A "Done" button 420 is provided which, when activated, saves the data entered into the time sheet record and exits the current record. A "Details . . . " button 422 is also provided which allows the user to specify in greater detail the processing of the current record. These instructions may specify that the work is not billable, or that the bill is be put on hold, among others. A "Reports" button 424 provides the user with a choice of reports such as those shown in FIG. 10. Finally, a "Cancel" button 426 allows the user to exit the current software without saving the data entered in the current record.

Turning now to FIG. 12, the screen for entering expenses is shown. Similar to that of FIG. 11, the triangular choice box 430 allows the user to switch between the Expense Sheet and the Time Sheet. In FIG. 12, fields 431–436 correspond to fields 401–406 of FIG. 11. Further, the description of the dialog boxes 420–426 remains unchanged. Thus, these elements need not be described further.

In FIG. 12, an attendees field 438, a city field 440, and a mileage field 442 are provided to allow the user to enter travel-related expense information. The user may enter these information by writing them or by dictating the information, or a suitable combination thereof, into the data logging computer system. Additionally, an expense ID field 444 is provided to classify the type of expense, including airfare, mails, car expense, car rental, entertainment, gas, gifts, hotel, incidentals, laundry, local transportation, mileage, office supplies, postage, telephone, tips, tolls/parking, among others. Further, a payment ID field 446 is provided to quickly indicate the source of payment, which includes various credit cards and debit cards such as VISA, Mastercard, American Express, Diner's Club, check and cash, among others. Finally, a date field 447 is provided for recording the date of the event, and an amount field 448 is provided to accept the cost of the transaction being tracked. By using the screens of FIGS. 11 and 12, the user can easily enter time as well as expenses into the computer for organization and tracking purposes.

In addition to enabling the user to track his or her billable hours and expenses, the data logging system of the present invention is integrated with the information contained in the address or contact database, the appointment or calendar database, the to-do list database, and a memo-writing editor. As an appointment or a to-do item is made, the user is prompted to enter the client information, and the matter information, and the description. When the data logging system generates a reminder to the user, the data logger also asks the user if the event will occur as originally planned. If the user accepts, the information from the appointment book is copied into the time and billing system such that the information need to be entered only once. Thus, when the user places a call or conducts a meeting on behalf of a billable project pursuant to a previously scheduled appointment, the event is automatically logged under the appropriate matter file and the timer is started to capture billing time.

The power and elegance of the integrated time and expense billing system of the present invention are described next in an example. In this example, while the user is working on one matter, an incoming call from another client and/or matter may be received by the user. When the call is received, the present invention temporarily suspends the current matter being worked on by placing the timer in the current time-slip into a suspended mode. The present invention then generates another time-slip and enables the timer for that time-slip to start tracking the time associated with the new matter. The client code may be entered directly, or the identity of the individual is entered via the handwriting or the voice recognizer of the preferred embodiment. The entry of the client and matter information automatically triggers a recall from various databases, including phone logs, note fields, previous billable activities, among others, regarding previous communications with the client or the individual associated with the task. Concurrently, when the event is an out-going telephone call, the routine forwards the expense statistics to the expense database, logged under the same client/matter identification. Further, during the conversation, action items are identified. As such, the user activates the to-do list database and enters these action items, along with their deadlines into the to-do database. The present invention automatically inserts the client and matter information into the newly added records of the to-do database. After the user completes the call, the routine saves relevant time-slips and expense records to complete the processing of the time and expense slips or sheets generated by the call. It then returns the clock to the time-slip of the previous task and places the timer of the pending time-slip back into the active mode to cause the duration count register to increment for the formerly suspended task. When a particular activity is completed, the total time interval spent on the project is recorded. The time recorded may be the actual time spent, or some multiple of time thereof in accordance with a predetermined minimum time segment policy. A number of reports can be generated to allow the user to keep track of billing time related bills and non-time related costs for multiple clients, each of whom may have different matters with different billing rates. The present invention thus provides a number of levels of security to prevent unauthorized browsing of the user's data for the network-based version and scrambling and password protection for the stand-alone version. Thus, the present invention provides an easy to use, yet secured system for tracking time and expense information related to the performance of tasks on behalf of the client. Further, when the data logging system is docked with the host computer which runs the accounting system, the data stored in the nonvolatile memory is retrieved and uploaded to an accounting system for billing purposes.

As work related charges are recorded on the spot by the present invention, the present invention helps the user to capture more of his or her billable times. Further, the captured data is already in a format that can be transparently imported into the accounting and billing system. Thus, errors related to incorrect data entries or misreading of the user's handwritings are avoided. As the present inventions records in detail the time spent by the user in performing the task as well as the description of the work, the computerized bills show more detail such that clients are less likely to call up with questions. In addition, since the bills have an extremely accurate appearance, similar to a credit card or utility bill, clients are more likely to pay them. A computerized billing system also will help the company recover lost fee and cost transactions. In terms of freeing up back office time, firms that usually spent days preparing bills manually find that with automation, they can perform the same job in hours. Additionally, by tracking different types of cases, the employer may discover emerging lucrative practice alternatives, or the company may decide to avoid handling certain matter types. Thus, the automated time and expense billing system of the present invention decreases the time spent collecting information and time spent in preparing the bills. Further, the bills are so detailed and accurate that clients are more likely to pay their bills, resulting in increased cash flow of the user or the employer.

Although the preferred embodiment is a time and expense data logging system for attorneys, accountants, consultants, managers, and other professionals who bill clients by the hour, or some multiple of time thereof, the present invention also serves users who wish to keep detailed records of, for example: monthly consumer purchases (for example food, clothing, entertainment expenses, automotive maintenance costs, personal grooming costs, expenditure costs on gifts etc.); salespeople who sell goods or services at a fixed price per item/service (for example television sales executive selling advertising time, or a street vendor selling foodstuffs or consumer merchandise etc.) and purchasing agents who buy goods from one or more sources based on cost by volume or per item (for example a purchasing agent for a retail store, or a restaurateur purchasing supplies, or an antique dealer purchasing items for clients, etc.) Thus, the present invention flexibly addresses the needs of a wide variety of users.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

What is claimed is:

1. A program storage device having a computer readable code embodied therein for recording time and expense data pertaining to the performance of a task by a user, said task having a start time and a completion time, said program storage device comprising:

an input recognizer adapted to receive non-cursive handwritings from said user, said input recognizer converting said non-cursive handwritings into text data;

a timer adapted to receive instructions from said user to measure a duration count between said task start time and said completion time, said timer having an active state in which said timer increments said duration count and a suspended state in which said timer maintains said duration count; and a database coupled to said input recognizer and said timer, said database having at least one record, each of said records having data fields adapted to store said duration count and said text data.

2. The program storage device of claim 1, wherein said task is performed on behalf of a client, wherein said input recognizer is adapted to receive a client identifier from said user, wherein said record further comprises a client data field adapted to store said client identifier associated with said task.

3. The program storage device of claim 2, wherein said task is associated with a matter, wherein said input recognizer is adapted to receive a matter identifier from said user, wherein said record further comprises a matter data field adapted to store said matter identifier associated with said task.

4. The program storage device of claim 1, wherein said task is annotated by a description, wherein said input recognizer is adapted to receive said description from said user, wherein said record further comprises a description data field adapted to store said description associated with said task.

5. The program storage device of claim 1, further comprising an error corrector coupled to said fields of said records for spell-checking and correcting text data entered into said fields.

6. The program storage device of claim 5, wherein said text data has at least one word, wherein said error corrector further comprises a cache for storing most recently used entries in a cached vocabulary list, said cache adapted to compare each of said words against entries in said cached vocabulary list.

7. The program storage device of claim 1, further comprising a to-do list coupled to said database, said to-do list having at least one record, each of said to-do list records having at least one field linked to at least one field of said database.

8. The program storage device of claim 1, further comprising an appointment list coupled to said database, said appointment list having at least one record, each of said appointment list records having at least one field linked to at least one field of said database.

9. A program storage device having a computer readable code embodied therein for recording time and expense data pertaining to the performance of a task by a user, said task having a start time and a completion time, said program storage device comprising:

an input recognizer adapted to receive cursive handwritings from said user, said input recognizer converting said cursive handwritings into text data;

a timer adapted to receive instructions from said user to measure a duration count between said task start time and said completion time, said timer having an active state in which said timer increments said duration count and a suspended state in which said timer maintains said duration count;

a database coupled to said input recognizer and said timer, said database having at least one record, each of said records having data fields adapted to store said duration count and said text data; and an error corrector coupled to said fields of said records for spell-checking and correcting text data entered into said fields.

10. The program storage device of claim 9, wherein said task is performed on behalf of a client, wherein said input recognizer is adapted to receive a client identifier from said user, wherein said record further comprises a client data field adapted to store said client identifier associated with said task.

11. The program storage device of claim 10, wherein said task is associated with a matter, wherein said input recognizer is adapted to receive a matter identifier from said user, wherein said record further comprises a matter data field adapted to store said matter identifier associated with said task.

12. The program storage device of claim 9, wherein said task is annotated by a description, wherein said input recognizer is adapted to receive said description from said user, wherein said record further comprises a description data field adapted to store said description associated with said task.

13. The program storage device of claim 12, further comprising an appointment list coupled to said database, said appointment list having at least one record, each of said appointment list records having at least one field linked to at least one field of said database.

14. A program storage device having a computer readable code embodied therein for recording time and expense data pertaining to the performance of a task by a user, said task having a start time and a completion time, said program storage device comprising:

an input recognizer adapted to receive verbal instructions from said user, said input recognizer converting said verbal instructions into text data;

a timer adapted to receive instructions from said user to measure a duration count between said task start time and said completion time, said timer having an active state in which said timer increments said duration count and a suspended state in which said timer maintains said duration count; and a database coupled to said input recognizer and said timer, said database having at least one records, each of said records having data fields adapted to store said duration count and said text data.

15. The program storage device of claim 14, wherein said task is performed on behalf of a client, wherein said input recognizer is adapted to receive a client identifier from said user, wherein said record further comprises a client data field adapted to store said client identifier associated with said task.

16. The program storage device of claim 15, wherein said task is associated with a matter, wherein said input recognizer is adapted to receive a matter identifier from said user, wherein said record further comprises a matter data field adapted to store said matter identifier associated with said task.

17. A computer system for recording time and expense data pertaining to the performance of a task by a user, said task having a start time and a completion time, said computer system comprising:

a processor;

a data storage device coupled to said processor;

an input recognizer adapted to receive one of verbal instructions and non-cursive handwritings from said user, said input recognizer converting one of said verbal instructions and non-cursive handwritings into text data;

a timer adapted to receive instructions from said user to measure a duration count between said task start time and said completion time, said timer having an active state in which said timer increments said duration count and a suspended state in which said timer maintains said duration count; and a database coupled to said input recognizer and said time, said database having at least one record, each of said records having data fields adapted to store said duration count and said text data.

18. The computer system of claim 17, wherein said task is performed on behalf of a client, wherein said input recognizer is adapted to receive a client identifier from said user, wherein said record further comprises a client data field adapted to store said client identifier associated with said task.

19. The computer system of claim 17, further comprising an error corrector coupled to said fields of said records for spell-checking and correcting text data entered into said fields.

20. The computer system of claim 17, further comprising an appointment list coupled to said database, said appointment list having at least one record, each of said appointment list records having at least one field linked to at least one field of said database.

21. The computer system of claim 17, further comprising a to-do list coupled to said database, said to-do list having at least one record, each of said to-do list records having at least one field of said database.

* * * * *